US012723633B2

(12) United States Patent
Seibert et al.

(10) Patent No.: US 12,723,633 B2
(45) Date of Patent: Sep. 1, 2026

(54) BRAKE ACTUATOR AND VEHICLE BRAKE

(71) Applicants: ZF Active Safety GmbH, Koblenz (DE); ZF Friedrichshafen AG, Friedrichshafen (DE)

(72) Inventors: Werner Seibert, Kammerforst (DE); Felix Hiester, Rueber (DE); Roman Bechmann, Koblenz (DE); Thomas Schwegler, Tettnang (DE); Stephen Pudvay, Howell, MI (US)

(73) Assignees: ZF ACTIVE SAFETY GMBH, Koblenz (DE); ZF FRIEDRICHSHAFEN AG, Friedrichshafen (DE)

( * ) Notice: Subject to any disclaimer, the term of this patent is extended or adjusted under 35 U.S.C. 154(b) by 407 days.

(21) Appl. No.: 18/358,370

(22) Filed: Jul. 25, 2023

(65) Prior Publication Data

US 2025/0035176 A1 Jan. 30, 2025

(51) Int. Cl.
*F16D 65/18* (2006.01)
*F16D 121/24* (2012.01)
(Continued)

(52) U.S. Cl.
CPC .......... *F16D 65/18* (2013.01); *F16D 2121/24* (2013.01); *F16D 2125/40* (2013.01); *F16D 2125/48* (2013.01)

(58) Field of Classification Search
None
See application file for complete search history.

(56) References Cited

U.S. PATENT DOCUMENTS

2007/0011484 A1 1/2007 Chriss et al.
2014/0069750 A1* 3/2014 Nohira ................. B60T 13/741 188/71.8

(Continued)

FOREIGN PATENT DOCUMENTS

DE 10233673 A1 3/2003
DE 102022130191 A1 5/2023

OTHER PUBLICATIONS

Corresponding German Patent Application No. 102024120556.3, Search Report dated Apr. 15, 2026.

*Primary Examiner* — Robert A. Siconolfi
*Assistant Examiner* — Karem Akram Algarash
(74) *Attorney, Agent, or Firm* — Tarolli, Sundheim, Covell & Tummino LLP

(57) ABSTRACT

Specified is a brake actuator (12), in particular for an electromechanical vehicle brake (10), having an electric motor (32) for activating the vehicle brake (10), and a blocking module (36) for selectively rotationally blocking an output shaft (38) of the electric motor (32) so as to configure a parking brake function. The blocking module (36) comprises a blocking lever (40) which is mounted so as to be pivotable between a locking position and a releasing position, and a blocking actuator (42) for pivoting the blocking lever (40), wherein configured on the blocking lever (40) is a blocking tooth (44) which in the locking position of the blocking lever (40) engages with a gear wheel coupled to the output shaft (38) of the electric motor (32). The blocking tooth (44) on one tooth flank (60) has a blocking geometry (61), and on an opposite tooth flank (62) has a lifting geometry (63), said geometries (61, 63) being configured in such a manner that in a rotation of the electric motor (32) in a first direction that boosts a braking force, the blocking lever (40) by the rotation of the electric motor (32) is lifted counter to a spring force so as to disengage from the (Continued)

gear wheel, and a rotation of the electric motor (32) in an opposite direction that releases the braking force is blocked. A vehicle brake (10) is furthermore specified.

15 Claims, 5 Drawing Sheets

(51) Int. Cl.
*F16D 125/40* (2012.01)
*F16D 125/48* (2012.01)

(56) References Cited

U.S. PATENT DOCUMENTS

2019/0152460 A1* 5/2019 Antanaitis ............. B60T 13/741
2019/0287705 A1 9/2019 Pellmann
2023/0150467 A1* 5/2023 Chelaidite ............... B60T 1/065
188/72.8
2025/0035177 A1* 1/2025 Schwegler ............ F16D 63/006

* cited by examiner

BRAKE ACTUATOR AND VEHICLE BRAKE

TECHNICAL FIELD

The invention relates to a brake actuator, in particular for an electromechanical vehicle brake, and to an electromechanical vehicle brake.

BACKGROUND

Brake actuators in vehicle brakes serve for bringing to bear a brake pad on a brake rotor. For this purpose, the brake actuator usually has an electric motor which for driving is coupled to an activation slide by way of a gearbox unit and a spindle drive, said activation slide for bringing to bear the brake pad on the brake rotor being selectively displaceable between a retracted position and a deployed position. For bringing to bear the brake pad on the brake rotor, an axial actuating force is in particular transmitted from the activation slide to the brake pad.

Apart from functioning as a service brake, the electromechanical vehicle brake is also intended to function as a parking brake. As the vehicle brake is configured to be self-releasing, a blocking lever which locks the mechanism of the vehicle brake such that the vehicle brake cannot be released is provided for implementing a parking brake function.

However, automatic re-tensioning of the vehicle brake may be necessary during the time a vehicle is parked because the tension force of the vehicle brake in a parking situation may weaken by virtue of the vehicle brake cooling down after parking.

In order for this to be implemented, the blocking lever has to be released before the braking force can be readjusted by means of activating the electric motor. The blocking lever is subsequently activated again.

It is problematic here that, owing to the self-releasing embodiment of the vehicle brake, the braking force may further weaken in a time window between the release of the blocking lever and the activation of the electric motor.

SUMMARY

It is, therefore, an object of the invention to provide a brake actuator, in particular for an electromechanical vehicle brake, which has an improved parking brake function.

This object is achieved according to the invention by a brake actuator, in particular for an electromechanical vehicle brake, having an electric motor for activating the vehicle brake, and a blocking module for selectively rotationally blocking an output shaft of the electric motor so as to configure a parking brake function. The blocking module comprises a blocking lever which is mounted so as to be pivotable between a locking position and a releasing position, and a blocking actuator for pivoting the blocking lever, wherein configured on the blocking lever is a blocking tooth which in the locking position of the blocking lever engages with a gear wheel coupled to the output shaft of the electric motor. The blocking tooth on one tooth flank has a blocking geometry, and on an opposite tooth flank has a lifting geometry, said geometries being configured in such a manner that in a rotation of the electric motor in a first direction that boosts a braking force, the blocking lever by the rotation of the electric motor is lifted counter to a spring force so as to disengage from the gear wheel, and a rotation of the electric motor in an opposite direction that releases the braking force is blocked, so that a ratchet function is implemented.

By virtue of the resilient mounting of the blocking lever and the lifting geometry implemented on the blocking tooth, the blocking actuator does not have to be switched when readjusting the electric motor. In this way, a state in which the blocking lever is in a releasing position without the electric motor being active is avoided. In other words, the blocking lever is released only by the rotation of the electric motor. It is guaranteed as a result that the vehicle brake cannot be released any further, but that only the braking force can be boosted in order to implement a readjustment of the braking force in the parked state of the vehicle.

The blocking geometry on the blocking tooth likewise contributes towards the vehicle brake not being able to be further released in the parked state of the vehicle, in that said vehicle brake prevents the rotation of the electric motor in a corresponding direction.

Moreover, the spring force acting on the blocking lever ensures that once the vehicle brake has been readjusted the blocking tooth engages in the gear wheel again and locks the vehicle brake. In particular, the spring force causes the blocking tooth to engage with the gear wheel each time the blocking tooth has moved across a tip of a tooth of the gear wheel.

The tooth flank that comprises the blocking geometry is preferably configured so as to be steeper than the tooth flank that comprises the lifting geometry. As a result, the blocking geometry reliably blocks a rotation of the gear wheel, and thus also of the electric motor, in a direction that releases the braking force. In contrast, the flatter tooth flank with the lifting geometry makes it possible that a tooth of the gear wheel slides along the lifting geometry and thus lifts the blocking lever during rotation of the electric motor.

For example, the blocking geometry of the blocking tooth runs orthogonally to the blocking lever. As a result, reliable locking is guaranteed even in the event of high forces.

According to one embodiment, the blocking tooth in the locking position of the blocking lever engages with a drive pinion that is disposed directly on the output shaft of the electric motor. Owing to the size of the pinion, there is a relatively low torque acting on the drive pinion so that the forces acting on the blocking lever are also correspondingly low. This enables a cost-effective basic design of the blocking lever. In other words, the blocking lever can be conceived to be less stable than would be the case with higher torques.

The blocking actuator can comprise a bistable linear magnet. Non-energized locking of the blocking actuator in both terminal positions is possible in this way. As a result, it is possible for the brake actuator to be operated in a particularly energy-efficient manner. In particular, a single current pulse is sufficient for moving the blocking actuator from one terminal position to the opposite terminal position.

The terminal positions of the blocking actuator correspond to the releasing position and the locking position of the blocking lever.

The spring for applying to the blocking lever a preloading force in the direction of the locking position is preferably integrated in the blocking actuator. The spring is thereby protected against soiling and damage.

The blocking actuator can be a magnetic actuator having a moveable, linearly guided armature which is displaceably connected to a tappet coupled to the blocking lever, wherein the spring presses the tappet in the direction away from the blocking lever and, when compressed by the spring, the tappet is displaceable in relation to the armature in the direction towards the blocking lever. As a result of the compression of the spring it is thus possible to pivot the blocking lever without the magnetic actuator being activated. The spring is compressed in particular when a force acts on the blocking lever during rotation of the electric motor, as a result of which the tappet is extracted from the blocking actuator. In the process, the spring also prevents that the armature is moved by the tensile force acting on the tappet, so that any inadvertent switching of the magnetic actuator is prevented.

In an alternative embodiment, a spring for applying a pre-loading force in the direction of the locking position can be integrated in a bearing point of the blocking lever. This likewise enables pivoting of the blocking lever without the blocking actuator being switched.

Furthermore alternatively, the blocking actuator can have a linearly displaceable tappet which is coupled to the blocking lever, wherein a spring is integrated in the coupling location in such a manner that the blocking lever is resiliently mounted relative to the blocking actuator. Here too, pivoting of the blocking lever is made possible without the blocking actuator being switched. The spring also prevents a tensile force which is sufficiently high to move the armature of the blocking actuator from acting on the tappet.

The electric motor for driving can be coupled to an activation slide by way of a gearbox unit and a spindle drive, said activation slide for bringing to bear the brake pad on a brake rotor being selectively displaceable between a retracted position and a deployed position. In this way, a rotation of the electric motor can be converted into a linear movement of the activation slide, an axial actuating force for bringing the brake pad to bear on the brake rotor being caused as a result.

The object is furthermore achieved according to the invention by an electromechanical vehicle brake having a brake calliper, an activation slide which is linearly displaceable in the brake calliper and for bringing to bear a brake pad on a brake rotor is selectively displaceable between a retracted position and a deployed position, and having a brake actuator according to the invention, wherein the electric motor of the brake actuator for driving is coupled to an activation slide by way of a gearbox unit and a spindle drive.

As has already been described in the context of the brake actuator according to the invention, in the vehicle brake according to the invention a readjustment of the braking force in the parked state of the vehicle is required, whereby an inadvertent release of the vehicle brake is reliably avoided.

BRIEF DESCRIPTION OF THE DRAWINGS

Further advantages and features of the invention will become apparent from the following description and from the accompanying drawings, to which reference is made. In the drawings.

DESCRIPTION

Figure 1:
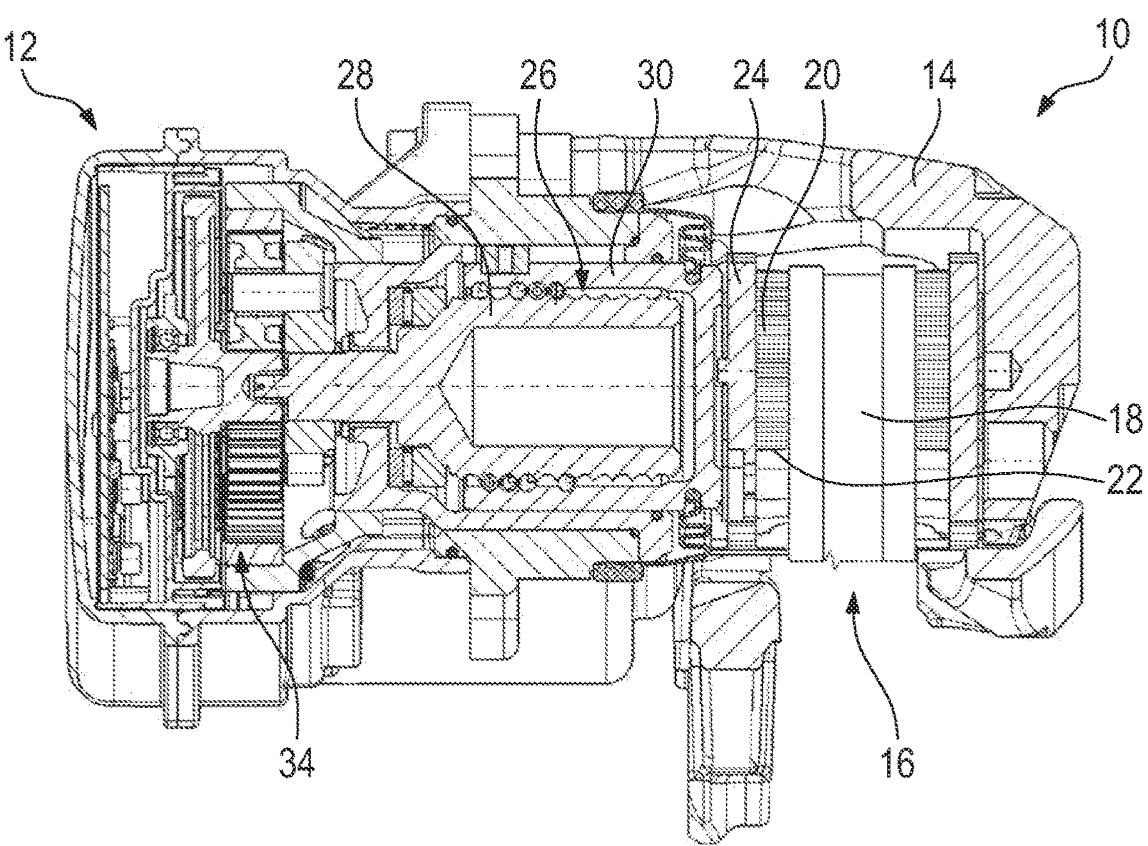
FIG. 1 shows a cross section through a vehicle brake according to the invention in the region of a spindle drive.

FIG. 1 shows a vehicle brake 10 having a brake actuator 12 in a sectional illustration. The vehicle brake 10 is an electromechanically activatable brake.

Figure 2:
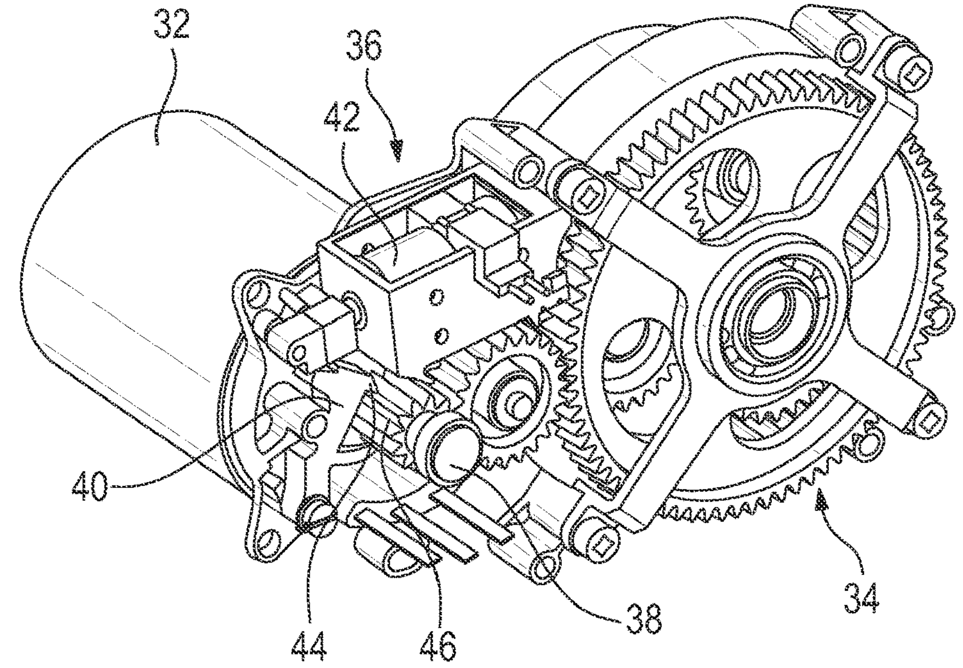
FIG. 2 shows a brake actuator according to the invention.

The brake actuator 12 is illustrated in a perspective view in FIG. 2.

The vehicle brake 10 comprises a brake calliper 14 in which an intermediate space 16 for the brake rotor 18 is formed.

A brake pad 20 which can be brought to bear on the brake rotor 18 is disposed in the intermediate space.

The brake pad 20 has a friction lining 22 and a backing plate 24 connected to the friction lining.

The vehicle brake furthermore comprises a spindle drive 26 which in the exemplary embodiment is a ball screw mechanism, having a rotatably mounted spindle 28 which is driven by an electric motor and on which is mounted an activation slide 30. The spindle 28 serves for axially moving the activation slide 30. The activation slide 30 forms the spindle nut of the spindle drive 26. The activation slide 30 specifically represents a brake piston.

For bringing to bear the brake pad 20 on the brake rotor 18, the activation slide 30 by way of an axial displacement is selectively displaceable between a deployed position and a retracted position.

The activation slide 30 is in particular guided in the brake calliper 14 so as to be secured against rotation.

The activation slide 30 in the deployed position presses against the brake pad 20 and transmits an axial actuating force to the brake pad 20.

The brake actuator 12 comprises an electric motor 32, as can be seen in FIG. 2.

Moreover, the brake actuator 12 comprises a gearbox unit 34.

The electric motor 32 for driving is coupled to the activation slide 30 by the gearbox unit 34 and the spindle drive 26 in order to displace the activation slide 30 between the retracted position and the deployed position.

An axial displacement of the activation slide 30 is caused in particular by a rotation of the spindle 28.

The vehicle brake 10 forms the service brake of a vehicle. This means that the vehicle brake 10 serves for decelerating the vehicle in the normal driving operation.

For this reason, the vehicle brake 10 is configured to be self-releasing. This means that the activation slide 30 can be automatically released from the brake pad 20 as soon as the electric motor 32 is inactive in the normal driving operation.

In order to additionally implement a parking brake function, the brake actuator 12 has a blocking module 36 for selectively rotationally blocking an output shaft 38 of the electric motor 32.

In that the output shaft 38 of the electric motor 32 is rotationally blocked the vehicle brake 10 can no longer be automatically released.

The blocking module 36 has a blocking lever 40 which is mounted so as to be pivotable between a locking position and a releasing position, and a blocking actuator 42 for pivoting the blocking lever 40.

The pivoting radius of the blocking lever 40 is restricted by a detent 43.

Configured on the blocking lever 40 is a blocking tooth 44 which in the locking position of the blocking lever 40 engages with a gear wheel coupled to the output shaft 38 of the electric motor 32.

In the exemplary embodiment the blocking tooth 44 in the locking position of the blocking lever 40 engages with a drive pinion 46 that is disposed directly on the output shaft 38 of the electric motor 32.

However, it is also conceivable that the blocking tooth 44 engages with another gear wheel of the gearbox unit 34.

However, since the drive pinion 46 typically has a smaller diameter than the other gear wheels of the gearbox unit 34, the engagement of the blocking lever 40 on the drive pinion is advantageous with a view to the torque acting on the blocking lever 40.

Figure 3:
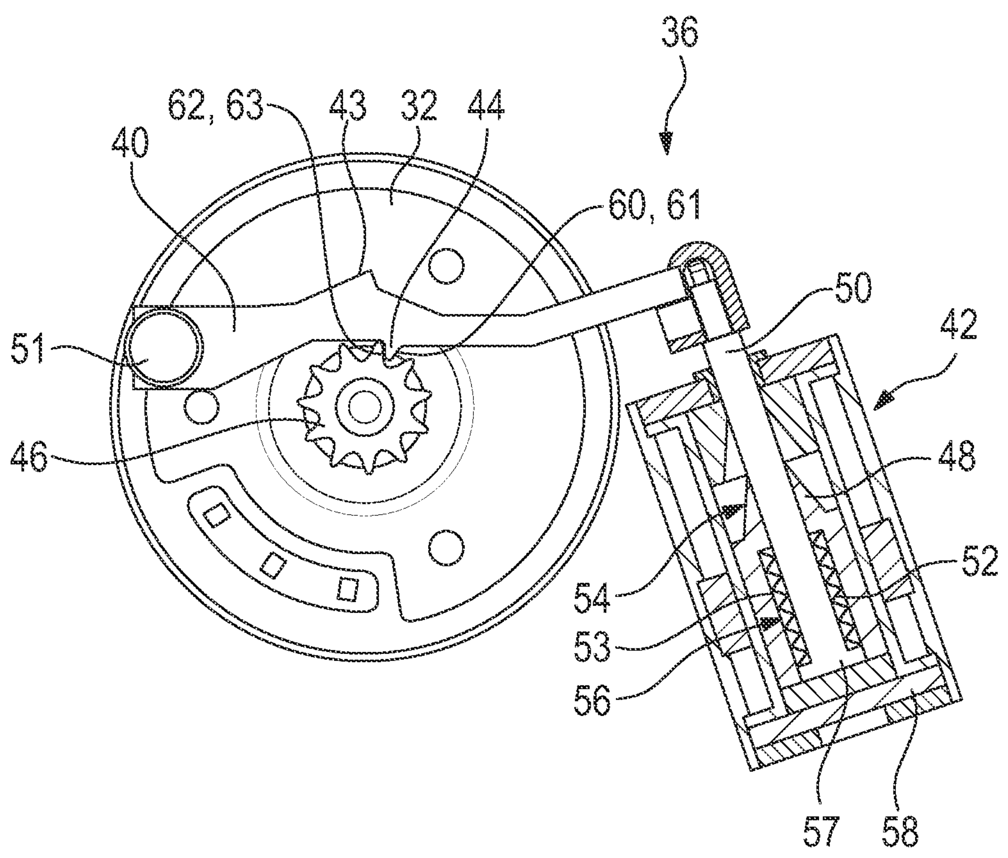
FIG. 3 shows a blocking module of the brake actuator.

FIG. 3 shows a blocking module 36 in which the brake actuator 12 is able to be used. For improved visualization, the electric motor 32 and the drive pinion 46 are also shown in FIG. 3.

The blocking lever 40 is illustrated in the locking position thereof in FIG. 3.

It can be seen from FIG. 3 that the blocking actuator 42 is a magnetic actuator. The blocking actuator 42 specifically comprises a bistable linear magnet.

Furthermore, the blocking actuator 42 comprises a moveable, linearly guided armature 48. The armature is in particular displaceable between two terminal positions which are visualized in FIGS. 4 and 5.

The armature 48 is connected to a tappet 50 coupled to the blocking lever 40.

The blocking lever 40 at the end thereof that faces away from the tappet 50 is pivotably mounted in a bearing point 51.

The tappet 50 is linearly displaceable by means of the armature 48 so as to move the blocking lever 40 from the locking position to the releasing position and vice versa.

Figure 4:
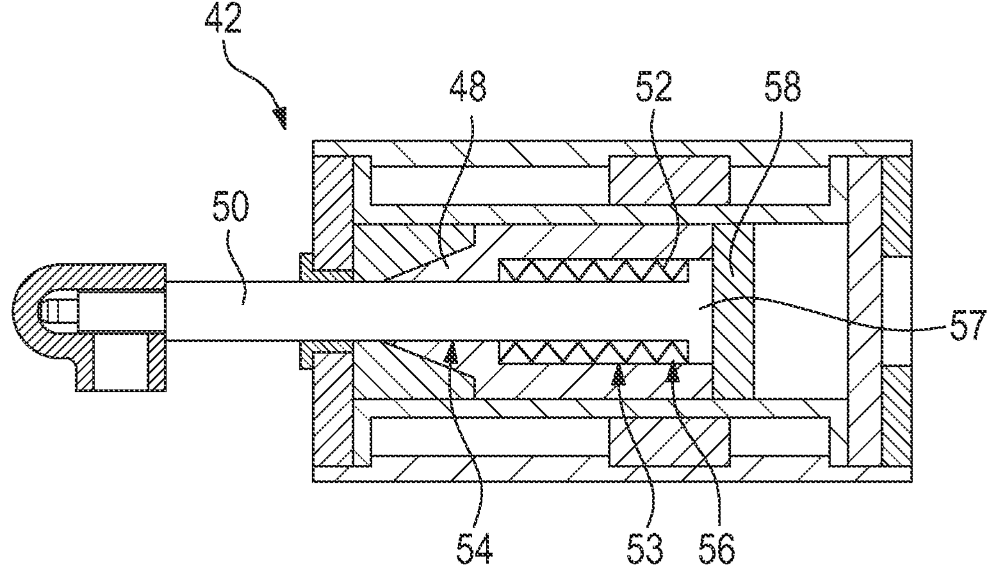
FIG. 4 shows a blocking actuator of the blocking module from FIG. 3 in a first state.

FIG. 4 shows the blocking actuator 42 in a deployed state, the latter corresponding to the releasing position of the blocking lever 40.

Figure 5:
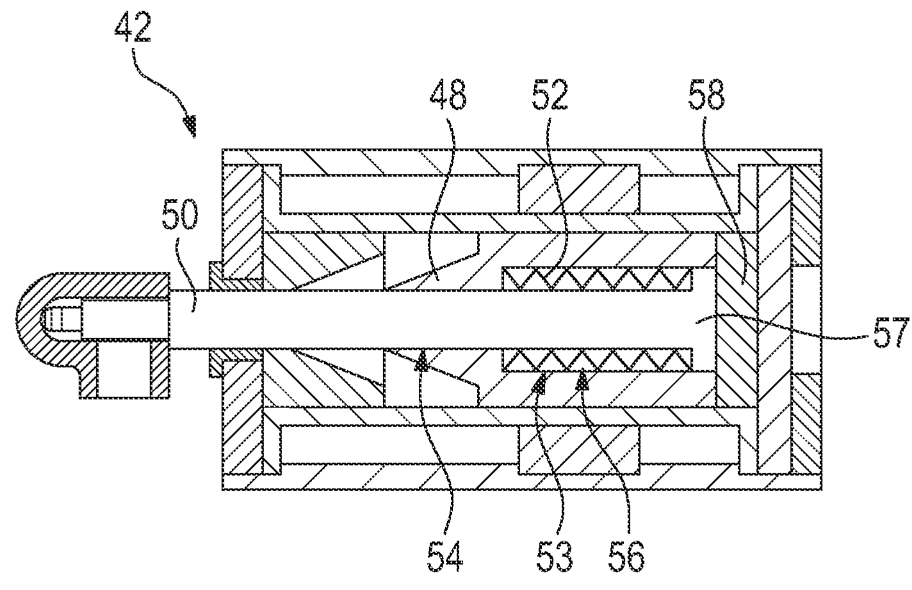
FIG. 5 shows the blocking actuator from FIG. 4 in a further state.

FIG. 5 shows the blocking actuator 42 in a retracted state, the latter corresponding to the locking position of the blocking lever 40.

In a parking situation it is usually necessary for the braking force to be readjusted when the vehicle brake cools down after the vehicle has been parked.

By means of the brake actuator 12 according to the invention this is possible without the blocking actuator 42 having to be activated, as a result of which the reliability of the parking brake function is enhanced.

For this purpose, the blocking lever 40 is resiliently mounted. The blocking tooth 44 additionally has a special geometry which enables a ratchet function.

The resilient mounting of the blocking lever 40 and the geometry of the blocking tooth 44 will be described hereunder by means of different embodiments.

In the embodiment illustrated in FIGS. 3 to 6, a spring 52 for applying to the blocking lever 40 a pre-loading force in the direction of the locking position is integrated in the blocking actuator 42.

In this embodiment, the tappet 50 is displaceably connected to the armature 48. Specifically the tappet 50 is linearly guided in the armature 48.

The spring 52 presses the tappet 50 in the direction away from the blocking lever 40.

When compressed by the spring 52, the tappet 50 is displaceable in relation to the armature 48 in the direction towards the blocking lever 40.

The armature 48 specifically has a central recess 53, wherein the recess 53 has a guide portion 54 in which the tappet 50 is linearly guided, and a receptacle portion 56 which adjoins the guide portion 54 and is widened in comparison to the guide portion 54.

The spring 52 is accommodated in the receptacle portion 56. More specifically, the spring 52 in the receptacle portion 56 circumferentially surrounds the tappet 50.

The spring 52 by way of one end is supported on the armature 48, and by way of the opposite end is supported on the tappet 50.

For this purpose, the tappet 50 has a laterally projecting appendage 57 on which the spring 52 is supported so as to impinge the tappet 50 towards the locking position.

The appendage 57 is disposed on that end of the tappet 50 that faces away from the blocking lever 40.

In order to avoid that the tappet 50 slides out of the armature 48, the armature 48 has a lid 58 that closes the receptacle portion 56.

Figure 6:
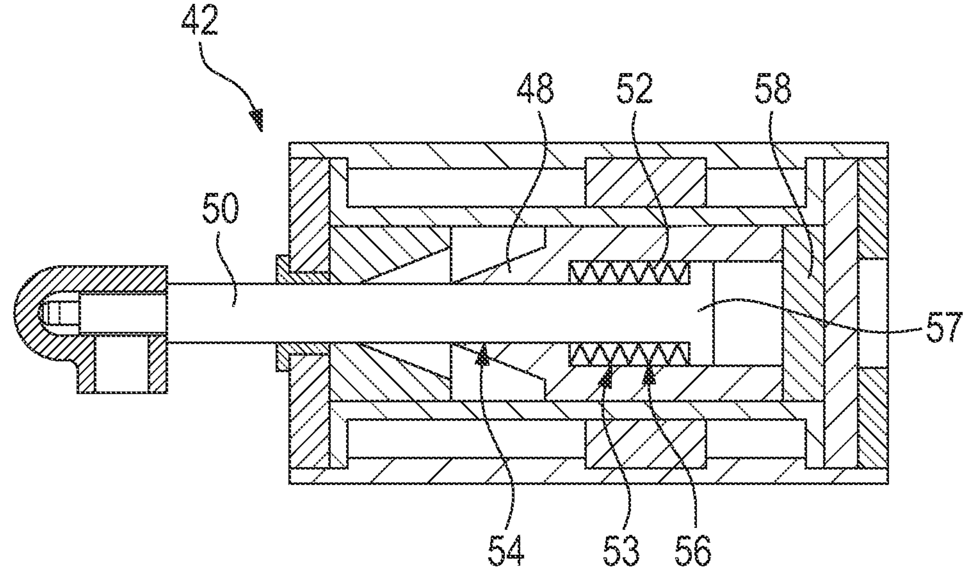
FIG. 6 shows the brake blocking actuator from FIGS. 4 and 5 in yet another state.

On account of the spring 52 it is possible to displace the tappet 50 even when the blocking actuator 42 is not switched, in that the spring 52 is compressed in particular by virtue of a tensile force acting on the tappet 50. This state is shown in FIG. 6.

Moreover, the spring 52 enables a compensation of production tolerances between the armature 48 and the tappet 50.

In order to enable the ratchet function, the blocking tooth 44 on one tooth flank 60 has a blocking geometry 61, and on an opposite tooth flank 62 has a lifting geometry 63.

The lifting geometry 63 is configured in such a manner that in a rotation of the electric motor 32 in a first direction that boosts the braking force, the blocking lever 40 by the rotation of the electric motor 32 is lifted counter to the spring force so as to disengage from the drive pinion 46.

More specifically, in a rotation of the electric motor 32 a tooth of the drive pinion 46 slides along the lifting geometry 63 of the blocking tooth 44 so that the latter is lifted from the drive pinion 46 and no longer meshes with the latter. As a result, a tensile force acts on the tappet 50, as a result of which the spring 52 is in turn compressed such that the tappet 50 can be extracted from the blocking actuator 42 without the blocking actuator being switched.

When the tip of the blocking tooth 44 meets a tip of a tooth of the drive pinion 46 in the process, the state of the blocking actuator shown in FIG. 6 is implemented.

It is also ensured on account of the spring 52 here that the armature 48 is not moved out of the terminal position of the latter when readjusting takes place, which could lead to inadvertent switching of the blocking actuator 42.

The blocking geometry 61 is configured in such a manner that a rotation of the electric motor 32 in an opposite direction that releases the braking force is blocked. It is impossible in particular to release the blocking tooth 44 from the meshing engagement with the drive pinion 46 by a rotation of the electric motor 32 in a direction that releases the braking force.

The tooth flank 60 that comprises the blocking geometry 61 is in particular configured so as to be steeper than the tooth flank 62 that comprises the lifting geometry 63.

Consequently, it is possible to readjust the braking force without the risk of further reducing the braking force.

Figure 7:
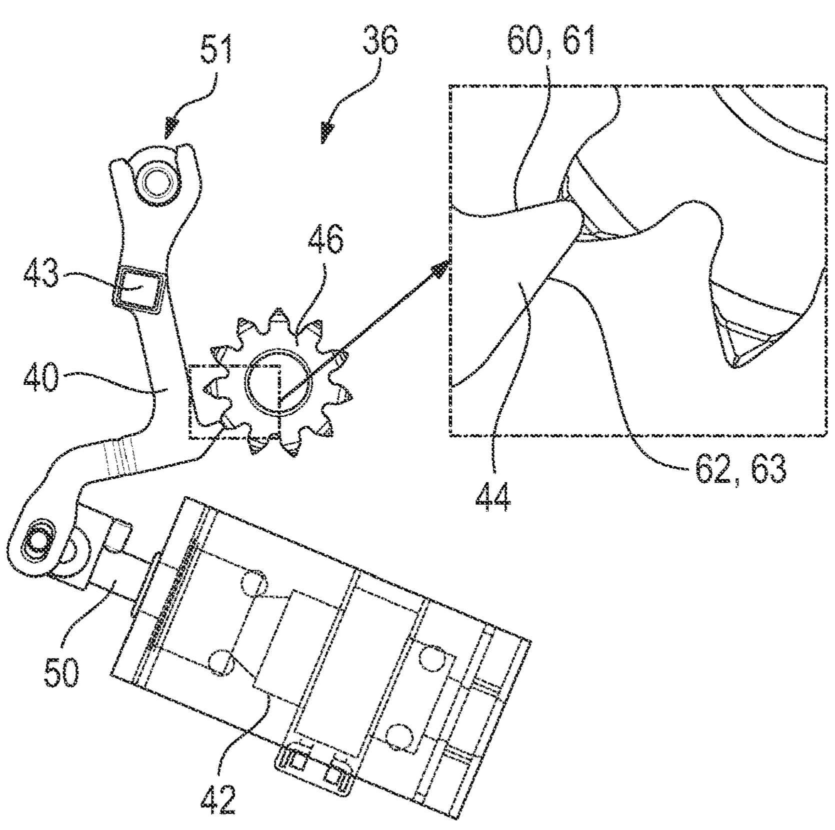
FIG. 7 shows an alternative blocking module for a brake actuator according to the invention.

FIG. 7 shows a blocking module 36 for a brake actuator 12 according to the invention and according to a further embodiment.

The blocking module 36 according to FIG. 7 differs from the blocking module 36 illustrated in FIG. 3 in terms of the shape of the blocking lever 40.

In the embodiment illustrated in FIG. 7, the blocking lever 40 has a rectangular portion between its two ends.

The blocking tooth 44 is disposed so as to be contiguous to the tip of the rectangular portion.

The blocking geometry of the blocking tooth 44 in this embodiment runs orthogonally to the blocking lever 40.

The functional mode of the blocking module 36 according to FIG. 7 is analogous to the functional mode of the blocking module 36 illustrated in FIG. 3.

In particular, the spring 52 is integrated in the blocking actuator 42, as described in the context of FIGS. 3 to 6.

Figure 8:
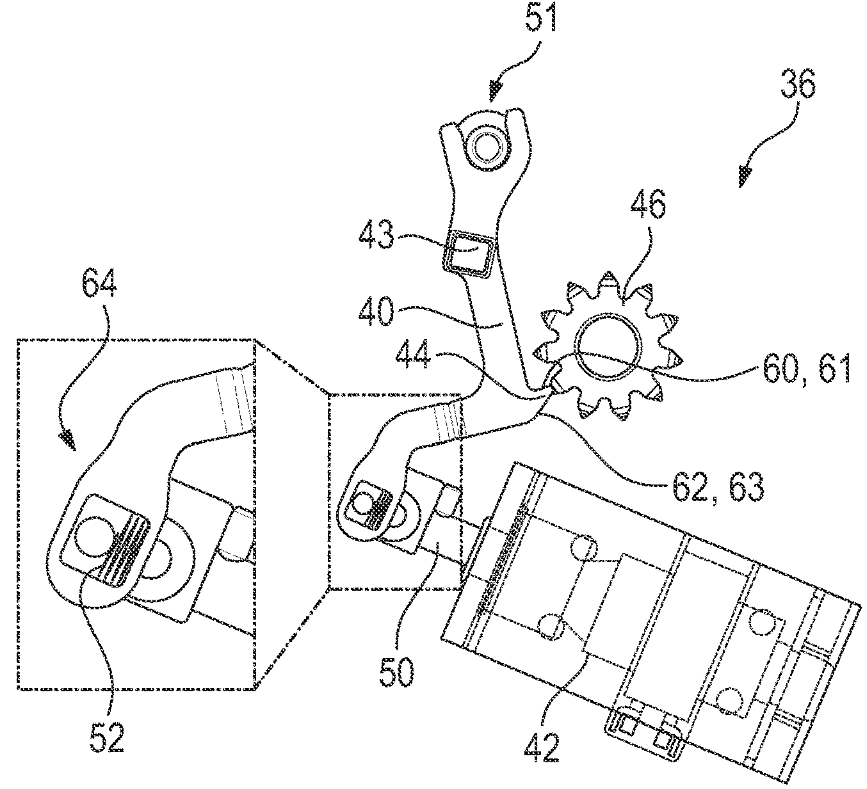
FIG. 8 shows a further alternative blocking module for a brake actuator according to the invention.

FIG. 8 shows a blocking module 36 for a brake actuator 12 according to the invention and according to yet another embodiment.

The blocking module 36 according to the embodiment illustrated in FIG. 8 differs from the previously described embodiments in terms of the disposal of the spring 52.

Specifically, the spring 52 is integrated in the coupling location 64 between the tappet 50 and the blocking lever 40. A resilient mounting of the blocking lever 40 relative to the blocking actuator 42 is likewise achieved as a result.

Figure 9:
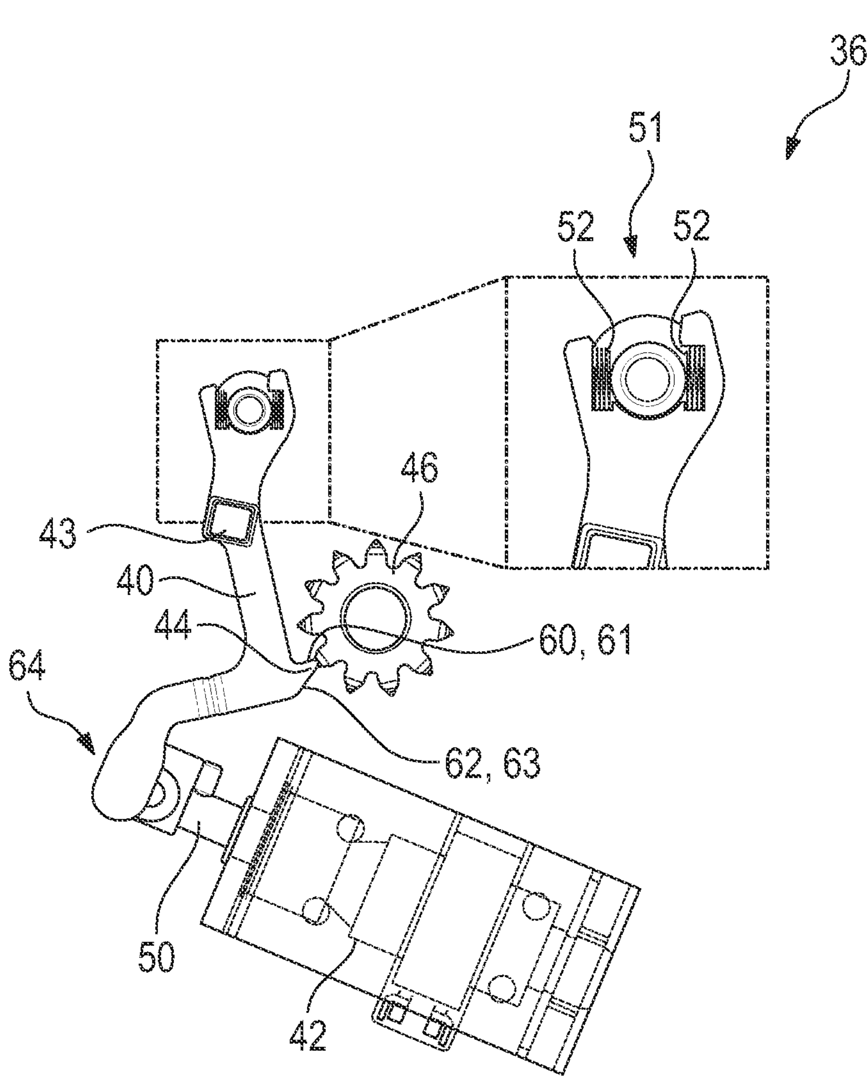
FIG. 9 shows another alternative blocking module for a brake actuator according to the invention.

FIG. 9 shows also an alternative blocking module 36 for a brake actuator 12 according to the invention.

The blocking module 36 according to the embodiment illustrated in FIG. 9 likewise differs from the previously described embodiments in terms of the disposal of the spring 52.

Specifically, the spring 52 for applying the pre-loading force in the direction of the locking position is integrated in the bearing point 51 of the blocking lever 40.

The invention claimed is:

1. Brake actuator (12) for an electromechanical vehicle brake (10), having an electric motor (32) for activating the vehicle brake (10), a blocking module (36) for selectively rotationally blocking an output shaft (38) of the electric motor (32) so as to configure a parking brake function, wherein the blocking module (36) comprises a blocking lever (40) which is mounted so as to be pivotable between a locking position and a releasing position, and a blocking actuator (42) for pivoting the blocking lever (40), wherein configured on the blocking lever (40) is a blocking tooth (44) which in the locking position of the blocking lever (40) engages with a gear wheel coupled to the output shaft (38) of the electric motor (32), wherein the blocking tooth (44) on one tooth flank (60) has a blocking geometry (61), and on an opposite tooth flank (62) has a lifting geometry (63), said geometries (61, 63) being configured in such a manner that in a rotation of the electric motor (32) in a first direction that boosts a braking force, the blocking lever (40) by the rotation of the electric motor (32) is lifted counter to a spring force so as to disengage from the gear wheel, and a rotation of the electric motor (32) in an opposite direction that releases the braking force is blocked wherein a spring (52) for applying a pre-loading force to the blocking lever (40) in the direction of the locking position is integrated in the blocking actuator (42), wherein the blocking actuator (42) is a magnetic actuator having a moveable, linearly guided armature (48) which is displaceably connected to a tappet (50) coupled to the blocking lever (40), wherein the spring (52) presses the tappet (50) in the direction away from the blocking lever (40) and, when compressed by the spring (52), the tappet (50) is displaceable in relation to the armature (48) in the direction towards the blocking lever (40).

2. Brake actuator (12) according to claim 1, wherein the tooth flank (60) that comprises the blocking geometry (61) is configured so as to be steeper than the tooth flank (62) that comprises the lifting geometry (63).

3. Brake actuator according to claim 2, wherein the blocking geometry (61) of the blocking tooth (44) runs orthogonally to the blocking lever (40).

4. Brake actuator (12) according to claim 1, wherein the blocking tooth (44) in the locking position of the blocking lever (40) engages with a drive pinion (46) that is disposed directly on the output shaft (38) of the electric motor (32).

5. Brake actuator (12) according to claim 1, wherein the blocking actuator (42) comprises a bistable linear magnet.

6. Brake actuator (12) for an electromechanical vehicle brake, having an electric motor for activating the vehicle brake, a blocking module for selectively rotationally blocking an output shaft of the electric motor so as to configure a parking brake function, wherein the blocking module comprises a blocking lever which is mounted so as to be pivotable between a locking position and a releasing position, and a blocking actuator for pivoting the blocking lever, wherein configured on the blocking lever is a blocking tooth which in the locking position of the blocking lever engages with a gear wheel coupled to the output shaft of the electric motor, wherein the blocking tooth on one tooth flank has a blocking geometry, and on an opposite tooth flank has a lifting geometry, said geometries being configured in such a manner that in a rotation of the electric motor in a first direction that boosts a braking force, the blocking lever by the rotation of the electric motor is lifted counter to a spring force so as to disengage from the gear wheel, and a rotation of the electric motor in an opposite direction that releases the braking force is blocked, wherein a spring (52) for applying a pre-loading force in the direction of the locking position is integrated in a bearing point of the blocking lever.

7. Brake actuator (12) according to claim 6, wherein the tooth flank that comprises the blocking geometry is configured so as to be steeper than the tooth flank that comprises the lifting geometry.

8. Brake actuator (12) according to claim 6, wherein the blocking tooth in the locking position of the blocking lever engages with a drive pinion that is disposed directly on the output shaft of the electric motor.

9. Brake actuator (12) according to claim 6, wherein the blocking actuator comprises a bistable linear magnet.

10. Brake actuator (12) for an electromechanical vehicle brake, having an electric motor for activating the vehicle brake, a blocking module for selectively rotationally blocking an output shaft of the electric motor so as to configure a parking brake function, wherein the blocking module comprises a blocking lever which is mounted so as to be pivotable between a locking position and a releasing position, and a blocking actuator for pivoting the blocking lever, wherein configured on the blocking lever is a blocking tooth which in the locking position of the blocking lever engages with a gear wheel coupled to the output shaft of the electric motor, wherein the blocking tooth on one tooth flank has a blocking geometry, and on an opposite tooth flank has a lifting geometry, said geometries being configured in such a manner that in a rotation of the electric motor in a first direction that boosts a braking force, the blocking lever by the rotation of the electric motor is lifted counter to a spring force so as to disengage from the gear wheel, and a rotation of the electric motor in an opposite direction that releases the braking force is blocked, wherein the blocking actuator has a linearly displaceable tappet which is coupled to the blocking lever at a coupling location, wherein a spring is integrated in the coupling location in such a manner that the blocking lever is resiliently mounted relative to the blocking actuator.

11. Brake actuator (12) according to claim 10, wherein the tooth flank that comprises the blocking geometry is configured so as to be steeper than the tooth flank that comprises the lifting geometry.

12. Brake actuator (12) according to claim 10, wherein the blocking tooth in the locking position of the blocking lever engages with a drive pinion that is disposed directly on the output shaft of the electric motor.

13. Brake actuator (12) according to claim 10, wherein the blocking actuator comprises a bistable linear magnet.

14. Brake actuator (12) according to claim 1, wherein the electric motor (32) for driving is coupled to an activation slide (30) by way of a gearbox unit (34) and a spindle drive (26), said activation slide (30) for bringing to bear a brake pad (20) on a brake rotor (18) being selectively displaceable between a retracted position and a deployed position.

15. Electromechanical vehicle brake (10) having a brake calliper (14), an activation slide (30) which is linearly displaceable in the brake calliper (14) and for bringing to bear a brake pad (20) on a brake rotor (18) is selectively displaceable between a retracted position and a deployed position, and having a brake actuator (12) according to claim 1, wherein the electric motor (32) of the brake actuator (12) for driving is coupled to an activation slide (30) by way of a gearbox unit (34) and a spindle drive (26).

* * * * *